United States Patent [19]
Keldany et al.

[11] Patent Number: 4,957,586
[45] Date of Patent: Sep. 18, 1990

[54] APPARATUS FOR PRODUCING A WOUND PLASTIC TUBE

[75] Inventors: Rachid Keldany, Maur; Keith J. Shaw, Pfäffikon, both of Switzerland

[73] Assignee: Ametex AG, Niederurnen, Switzerland

[21] Appl. No.: 395,156

[22] Filed: Aug. 17, 1989

Related U.S. Application Data

[63] Continuation of Ser. No. 180,912, Apr. 13, 1988, abandoned.

[30] Foreign Application Priority Data

Apr. 14, 1987 [CH] Switzerland ............................ 1449/87

[51] Int. Cl.$^5$ .............................................. B29C 63/34
[52] U.S. Cl. ..................................... 156/428; 156/195; 156/294; 156/446

[58] Field of Search ............... 156/195, 425, 428, 429, 156/143, 144, 190–192, 294, 446; 228/145, 17.7; 219/62; 72/135, 145, 49–50

[56] References Cited

U.S. PATENT DOCUMENTS

| | | | |
|---|---|---|---|
| 3,192,088 | 6/1965 | Lariviere | 156/143 |
| 3,595,046 | 7/1971 | Malkki et al. | 72/49 |
| 3,606,779 | 9/1971 | Parma | 72/49 |
| 4,078,957 | 3/1978 | Bradt | 156/195 |
| 4,486,260 | 12/1984 | Schaefer | 156/143 X |
| 4,714,508 | 12/1987 | Chivens et al. | 156/195 |

*Primary Examiner*—David Simmons
*Attorney, Agent, or Firm*—Laurence R. Brown

[57] ABSTRACT

A tube winding apparatus includes a drum having a jacket formed by elongated cylindric members. A number of these members, namely the circumferential rollers, is motor driven basically by the normal drive of the winding apparatus. Such supports the tube and web drive and the feeding or advancing of the tube.

11 Claims, 2 Drawing Sheets

APPARATUS FOR PRODUCING A WOUND PLASTIC TUBE

This application is a continuation, of application Ser. No. 07/180,912, filed Apr. 13, 1988, now abandoned.

BACKGROUND OF THE INVENTION

1. Field of the Invention

The present invention relates to an apparatus for producing a tube wound from a web material, including a stationary winding drum having an inner surface on which a laterally fed plastic material web is wound spirally into a tube while adjoining web edges are bonded together, including further means operative to advance the plastic material web and means operative to bond the web edges to each other, and including a plurality of rod shaped cylindrical members forming the jacket of the drum which cylindrical members extend between the two face flanges of the drum.

2. Description of the Prior Art

The production of plastic tubes by the so-called winding method is generally known. To this end a plastic web is usually either spirally wound on a mandrel or, specifically in case of larger diameters, such plastic web is formed also spirally within a drum. The spirally extending seams of abutting or adjoining web side edges are either held together and/or welded or bonded together.

The present invention is directed to an apparatus for the production of such wound tubes. Generally, such apparatuses are used in the field, i.e. the tubes are produced at the location proper where they are used. Such happens for instance at locations where damaged tubes or pipes must be renovated or repaired respectively and this by insertion of a suitably produced plastic tube. In order to accomplish this object it has been found to be specifically suitable to produce a plastic tube to be inserted for above reason also on site, i.e. at the respective location proper, and to feed the tube being formed simultaneously into the tube or pipe under repair. The corresponding apparatus is thereby inserted often from above into a shaft (man hole).

The presently known tube winding apparatuses operating with a drum are generally equipped with a massive wall drum or with a drum having a jacket formed by rod shaped, cylindrical members extending between two face flanges. In recent apparatuses such rollers have been arranged freely rotatable between the face flanges, to counteract the friction between the web or the tube in production and the inner surface of the jacket and accordingly to decrease such friction as much as possible. The friction has been decreased also by other procedures, such that for instance surfaces were employed having as small as possible a coefficient of friction or even having lubricants.

SUMMARY OF THE INVENTION

It is, therefore, an object of the present invention to provide an apparatus for producing a tube wound from a web material in which the previously mentioned disturbing friction is reduced and these frictional forces are utilized rather for driving or feeding of the tube being formed as well as for the feeding of the produced tube.

A further object is to provide such an apparatus in which at least a number of the rod shaped cylindrical members located between the face flanges of the drum are motor driven in order to support the advancing of the web being fed and the wound tube, respectively.

By means of the driven cylindrical members, of which the circumferential speed must be at least equal to the driving speed of the web material, the driving of the tube or simultaneous advancing or feeding of the tube is supported by the friction acting between the web material and the driven members. This allows producing and feeding of very large lengths of tubes. The large bending forces in the web material made of plastic and their reaction onto the cylindrical members forming the jacket of the drum, of which at least a number is driven, causes the web or tube to move in the circumferential and tube advancing direction.

Yet a further object is to provide a tube producing apparatus in which the rod shaped members are arranged in equal angular distances between the face surfaces and in which for instance every second member is driven. These driven members are also termed circumferential rollers.

A still further object is to provide such an apparatus in which all driven members are driven by one common drive which at the same time is operative as a drive for the means for the infeeding and for the advancing of the web material. The driving of mentioned members or circumferential rollers, respectively may be accomplished for instance via a chain, a toothed belt or similar acting onto driving heads at one end of the rod shaped members.

A further object is to provide such an apparatus in which the driven rod shaped members project through one of the facewalls of the drum and mentioned driving heads are located at the outside of the face wall.

Yet a further object is to provide such an apparatus in which the rotational speed of the driven members, i.e. the circumferential speed thereof equals the driving speed of the web material or feeding speed, resp. of the tube produced. It may, however, be forseen to select the circumferential speed of the driven circumferential rollers to be somewhat higher than the web driving speed such to positively guarantee an advantageous effect. It is also possible to arrange for an adjustable driving speed of these members.

A further object is to provide driven members or circumferential rollers, resp. which have a surface with increased friction, for instance provided with a rubber layer, a roughened or structured surface or similar.

Still a further object is to provide an apparatus, in which the adjoining abutting edges of the web are either mechanically mounted to each other and/or attached to each other by a welding or bonding by a bonding agent.

Yet a further object of the present invention is to provide such an apparatus comprising means for welding the adjoining abutting edges of the web. These welding means comprise preferably an ultrasonic welding apparatus which is located close to the exit end of the winding drum.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
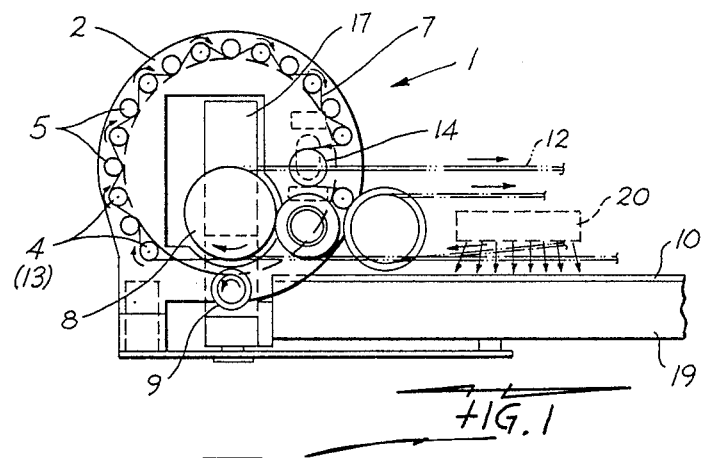
FIG. 1 is schematically a view of the driving face side of a preferred embodiment of the tube winding apparatus according to the present invention.
Figure 2:
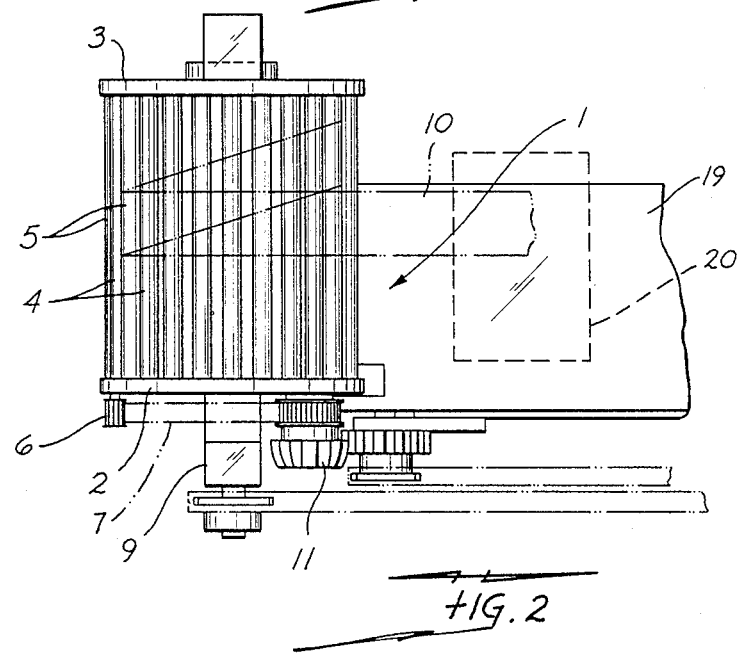
FIG. 2 is a top view of the apparatus of FIG. 1.
Figure 3:
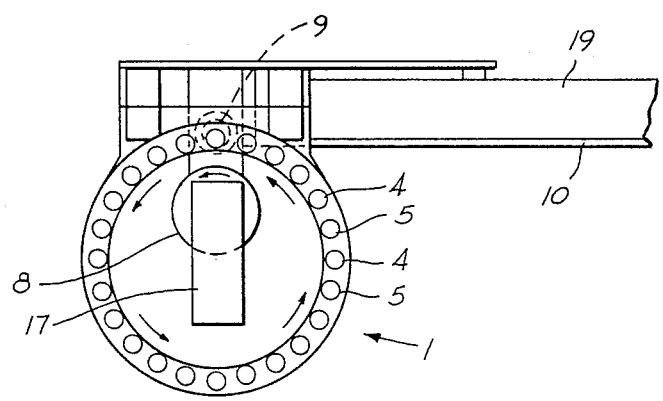
FIG. 3 is a view of the exit face side of the apparatus.
Figure 4:
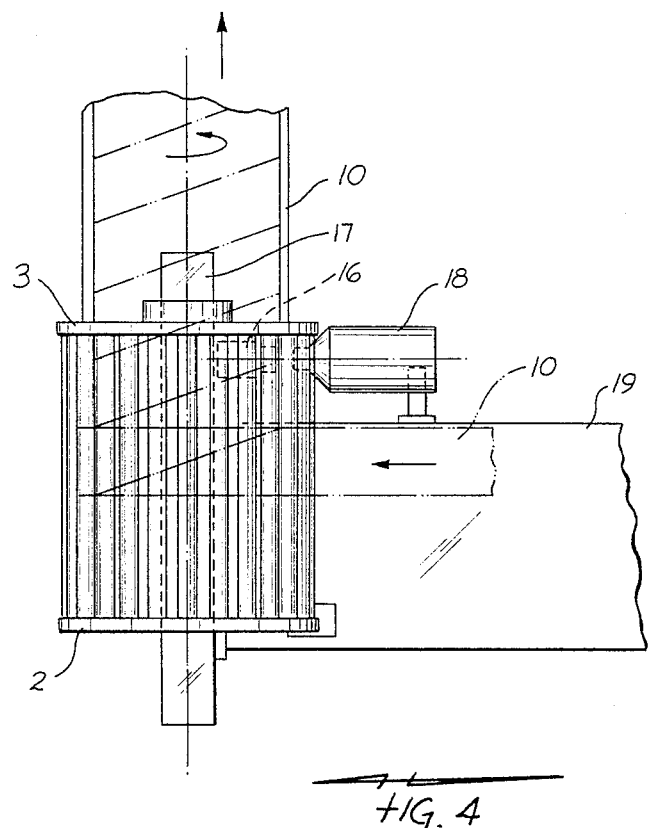
FIGS. 4 and 5 views are similar to those of FIGS. 2 and 3 having additionally an ultrasonic welding apparatus located at the exit end of the drum.

The tube winding apparatus illustrated in the drawings comprises mainly a so-called winding drum 1. It includes according to the illustrated embodiment a stationary cage-like drum 1 having an inlet face flange 2 and an outlet face flange 3 interconnected by bar-shaped cylindrical members 4. The members 4 are arranged stationary between the face flanges 2, 3 and form together the supporting frame of the stationary drum 1. Between the respective stationary connecting members 4 one respective member 5 is provided which is rotatable around its longitudinal axis, a so-called circumferential roller. These members 5 are jointly rotated via driving heads 6 located outside of the face flange 2 by a chain or toothed belt drive 7 and at a circumferential speed which is indentical to the circumferential speed of the tube driving rollers 8, 9 of commonly known design. These rollers pull the plastic web 10 foreseen for the forming of the tube from a supply spool and urge the web against the inner surface of the drum such to form there the tube proper, whereby this driving force serves simultaneously for advancing or feeding, resp. the produced tube out of the exit side of the drum.

Basically, it would be possible to select the circumferential speed of the circumferential rollers 5 which form the inner side of the drum to be somewhat higher than the tube driving speed proper (possibly slip between rollers and tube material). Due to the driven circumferential rollers 5 which rotate in the through-put direction of the web and tube, resp. the tube is driven additionally by these rollers 5 and accordingly they support the driving and feeding of the tube. Due to its inherent bending forces (bias) the web material 10 is urged onto the circumferential rollers 5 and driven additionally by the prevailing frictional forces (circumferential and feeding movement).

The driven circumferential rollers 5 can be provided preferably with a layer which increases friction (rubberized) or comprise a roughened or structured surface.

It has been mentioned above that the circumferential rollers 5 are driven preferably via toothed belts 7 and gear wheels 11 (spherical gear wheels) from the drive proper of the winding apparatus. The belt drive 8, 9 and 12 is of common design.

In accordance with the illustration the toothed belt may be guided over respective guide rollers 13 (in elongation of the connecting rods 4) such to safely and definitely engage into the driving heads 6 of the driven circumferential rollers 5. A stressing or tensioning, resp. device 14 for the toothed belt 7 may be provided.

Figure 5:
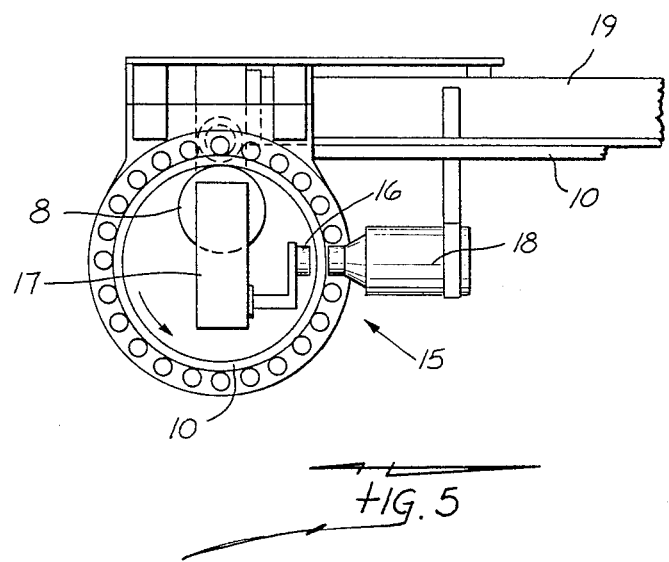

Additionally, a welding device, specifically an ultrasonic welding device 15 (see FIG. 5) may be located at the exit end of the drum. The part 16 of the welding device 15 located in the inside of the drum is mounted to a support 17 projecting from the inlet face side into the inside of the drum while the part 18 of the welding device located outside is mounted to the machine frame 19 proper. Due to the illustrated apparatus having the additional drive, not only the friction problems are optimally solved but the apparatus can produce and feed substantially larger lengths of tubes relative to the prior art.

The apparatus can be provided with a heating device 20 for heating the web material to be fed into the drum and thus to decrease the partly considerable inner stresses in view of the forming or shaping step proper.

While there are shown and described present preferred embodiments of the invention, it is to be distinctly understood that the invention is not limited thereto, but may otherwise be variously embodied and practiced within the scope of the following claims.

What is claimed is:

1. An apparatus for producing a tube wound from a plastic web material and for feeding the formed tube into an existing pipe for interiorly relining it, said apparatus comprising: a stationary, cage-like winding drum having an inner surface along which one side of a laterally moving plastic material web is received so that the web is wound spirally into a tube while adjoining web edges are joined together, the opposite side of the web being free and not in contact with any guide surface carried by the drum, web advancing means operative to advance said plastic material web into the winding drum, edge joining means operative to join adjacent edges of the spirally wound web to each other, a plurality of spaced, circularly arranged rod shaped cylindrical members defining the cage-like winding drum, which cylindrical members each have a length substantially greater than the width of said web and extend between the two spaced face flanges defining opposed ends of the drum, in which at least a number of said rod shaped cylindrical members are motor driven to rotate about their respective axes and to thereby contact and advance said web along the interior of said drum to wind the web spirally into a tube, and to thereby also contact and advance the resulting spiral wound tube, respectively, while adjoining edges of the web are joined together, and drive means for driving said rod-shaped driven members.

2. The apparatus of claim 1, in which said rod shaped members are arranged in equal angular distances around the drum ends, and in which at least every second member is driven by said drive means.

3. The apparatus of claim 1, in which all driven rod-shaped members are driven by a common drive.

4. The apparatus of claim 3, in which the drive means is operatively connected with driving heads located at one end of each of the driven rod shaped members.

5. The apparatus of claim 4, in which said driven rod shaped members project through one face flange of said drum and said driving heads are located at an outer side of the one face wall.

6. The apparatus of claim 1, in which said drive means and said web advancing means are synchronized such that the circumferential speed of said driven rod shaped members equals the circumferential speed of the web advancing means.

7. The apparatus of claim 1, in which the rotational speed of the driven rod-shaped members is adjustable.

8. The apparatus of claim 1, in which outer, web-contacting surfaces of the driven rod-shaped members include friction surface means for moving the web.

9. The apparatus of claim 1, in which said edge joining means include ultrasonic welding means.

10. The apparatus of claim 1, including heating means for heating said web prior to feeding the web into the drum.

11. Apparatus for forming a tube wound from a plastic web material and for feeding the formed tube into an existing tubular opening for interiorly relining it, said apparatus comprising:
- a stationary, cage-like cylindrical winding drum including a pair of axially spaced drum ends spaced from each other a distance substantially greater than the width of the plastic web material, and a plurality of non-rotatable guide members connected to and extending between the drum ends, the connecting members being uniformly spaced circumferentially about the drum to define an inner drum surface along which one side of a laterally moving plastic material web is received so that the web is wound spirally into a tube while adjacent web edges are joined together, the opposite side of the web being free and not in contact with any guide surface carried by the drum;
- web advancing means operative to advance the plastic web into the winding drum in a direction substantially tangential to the drum inner surface;
- web edge joining means for joining adjacent edges of the spirally wound web to each other to form a continuous spiral wound tube;
- a plurality of rotatable, rod-shaped cylindrical driving members extending between the drum ends, one driving member positioned between each of a pair of adjacent guide members for contacting and advancing said web spirally along the inner drum surface to wind the web into a spiral wound tube, and also to contact and advance the resulting spiral wound tube outwardly from inside the drum in a direction substantially parallel to the winding drum axis; and
- drive means for simultaneously rotating the driving members in a common direction for advancing the web and the spiral wound tube.

* * * * *